A. J. ALLEN.
COMPRESSION RHEOSTAT.
APPLICATION FILED APR. 26, 1920.
1,359,648.
Patented Nov. 23, 1920.
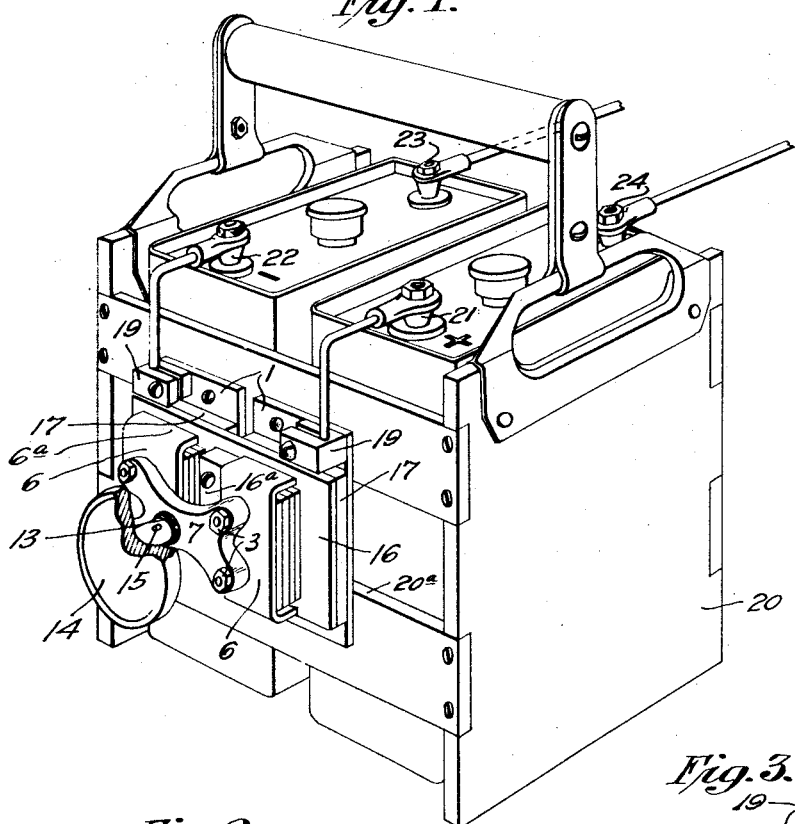
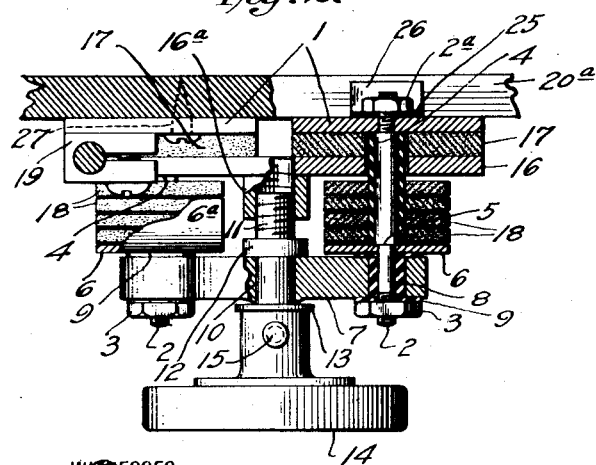
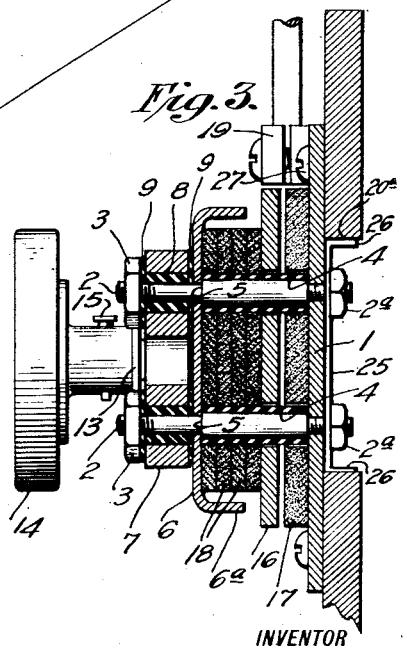
INVENTOR
Albert J. Allen
WITNESSES

UNITED STATES PATENT OFFICE.

ALBERT J. ALLEN, OF NEW YORK, N. Y.

COMPRESSION-RHEOSTAT.

1,359,648.  Specification of Letters Patent.  Patented Nov. 23, 1920.

Application filed April 26, 1920. Serial No. 376,822.

*To all whom it may concern:*

Be it known that I, ALBERT J. ALLEN, a citizen of the United States of America, residing at New York, in the county of New York and State of New York, have invented certain new and useful Improvements in Compression-Rheostats, of which the following is a specification.

My invention relates to rheostats of the carbon compression plate type particularly adapted for the wide regulation of electric currents in such work as meter testing, laboratory testing, and as general electric resistor for a wide range of loads. In particular, my invention has certain details of construction which increase its range of regulation far beyond that of the common type, and provides for the regulation required on heavy loads and also the wide regulation desired on light loads, both ranges overlapping. In meter testing it is desirable to draw various loads through the meter and with this use in view I have found it very convenient to provide a storage battery as a source of current, and I fasten my rheostat directly upon the side of the battery, thereby forming the entire equipment into a complete, compact, and portable set. In this use, upon arriving at the customer's meter it is only necessary to make the connections from the battery to the standard meter, which is also carried by the tester, and to the customer's meter. The current then flows through both the standard and the customer's meter, and the rate of flow depends upon the resistance of the rheostat which can be varied by simply turning a knob, thereby controlling the pressure upon the carbon plates. If a light load is desired with wide regulation the knob is turned in one direction which uses one set of plates, whereas if a heavy load is desired the knob is turned in the opposite direction and the current passes through the heavy carbon system which is so designed as to radiate the heat produced. Furthermore the use of two columns of contact plates and a bridge plate to connect them is a novel arrangement effecting a considerable improvement in size and shape. Likewise my rheostat may be put to many uses in laboratory circuits or power circuits requiring resistance regulation and a resistor with heat dissipating qualities.

It is therefore the prime object of my invention to provide a very compact rheostat of large heat dissipation, as well as wide load range and resistance regulation.

In its preferred design the rheostat is built upon a guiding system of four studs with the resistance and connection plates arranged thereon, but it is understood that this design is only one specific form and that many other arrangements of details could be made without departing from the scope of this invention.

In the drawings,

Figure 1 is a perspective view of my rheostat mounted upon the side of a storage battery with connections leading out for continuation to the meter or other apparatus.

Fig. 2 is a top view of the rheostat broken away in places in section to show the details of construction.

Fig. 3 is a vertical section along the center line of one set of studs and shows the detailed arrangement as well as the method of attaching to the battery case.

Similar reference numerals refer to similar parts throughout the drawings.

The rheostat is built upon two heavy metallic rear contact plates 1 which act as the principal contacts. Upon each of these are mounted two metallic studs or posts 2, being either fastened by the nuts $2^a$ or riveted into place, and positioned so as to extend outwardly at right angles to the said plates. The outer extremities of these studs are threaded to receive nuts 3. An insulating sleeve 4 covers each of the metallic studs 2 so as to insulate certain connector plates which pass over them. The sleeves stop even with the shoulder 5 on the stud 2 so that the front contact plates 6 may be firmly positioned on the studs and that they may be electrically connected through the stud to the back plates 1. On the outer extremity of the studs 2 is fastened a spider 7, which is insulated from the studs and the front contact plates 6 by insulating tubes 8 and insulating washers 9. Through the center hole 10 of this spider passes a pressure screw 11 which has flange 12 formed integrally thereon, and receives at its outer end the washer 13, the knob 14, and the lock pin 15, all acting to hold the pressure screw against axial movement but permitting a free rotation. The inner extremity of the pressure screw 11 threads into a bar $16^a$ fastened on the bridge contact plate 16, which rides forward and backward over the insulated sleeves 4 according to the direction of rotation of the knob 14. The bridge contact plate therefore moves under the control of the screw between the rear and front contact plates, 1 and 6, and is insulated from both. The rear plates 1 and the front plates 6 are however electrically in contact with the studs 2. Now to afford the desired resistance for heavy loads I insert a pair of carbon plates 17 of proper dimensions between the bridge contact plate 16 and the back plates 1, each being provided with slip holes to pass freely along the insulating sleeves 4. Upon movement of the bridge contact plate 16 in this direction by rotation of the screw 11 the carbon is compressed between the contact plate 16 and the rear contact plates 1; whereupon the current flows from one rear plate through the carbon, into the bridge plate, across the bridge, through the second carbon, and thence through the other rear contact plate 1 and to the line. The pressure upon the contact surfaces of the carbon and metallic plates is a measure of the current flow permitted, the tighter the contact the greater the flow. This arrangement provides for many of the ordinary uses but for finer adjustments of resistance and particularly on lighter loads, I have utilized the reverse side of the bridge contact plate to, with the same mechanism, press against a series of thinner plates 18, which are arranged in a similar manner to the heavier plates just described. The greater surface afforded by the plurality of plates increases the pressure range and the regulation. The plates 18 are forced outward by the screw and the bridge plate, and contact is made from plate 1 through the stud 2 to front contact plate 6 to the set of carbons pressed against this front plate, through the carbons to the bridge plate, through the bridge plate to the other set of carbons, through the carbons to the front contact plate on this side, through the contact plate to its stud, through the stud to its back contact plate 1 and thence to line.

The front contact plates are somewhat extended and turned over at the ends 6ª to form a protective shield for the carbons 18 against mechanical injury. Contact lugs 19 may be provided on the rear contact plates to receive the circuit wires. In order to position the rheostat firmly and accurately on the side of the battery case a pair of guide straps 25 with outwardly turned ends 26 are bolted to the plates 1 under the nuts 2ª, and are adapted to engage the edges 20ª of the sides of the battery case. Woodscrews 27 passing through the back plates finally secure the rheostat in position.

In operation, the rheostat having been connected in an electric circuit the knob 14 is turned to operate the screw which moves the bridge plate toward the carbons 18, which are in turn pressed against the front contact plates 6, with pressure suitable to pass a current of desired strength. If it is desired to further strengthen the current the knob is turned in the opposite direction whereby the bridge contact plate is moved against the heavier carbons 17 which make contact through the rear plates 1 and pass a current dependent upon the pressure applied.

For certain purposes the rheostat is applicable to the case of a storage battery 20 making connections from its rear plates 1 to terminals 21 and 22 on the battery, the other terminals 23 and 24 of the battery leading to close the circuit through any external line.

Having described my invention, what I claim as new and desire to secure by Letters Patent is:

1. A rheostat of the class described, comprising a set of contact plates, an electrically conducting bridge plate movable toward and from the said contact plates, conducting plates disposed between said bridge plate and said contact plates and adapted to be compressed thereby, substantially as described.

2. A rheostat of the class described, comprising opposite sets of contact plates, a bridge plate disposed and movable between them, conducting plates on opposite sides of said bridge plate, and adapted to be pressed by the said bridge plate and through the bridge plate form a connection between the said contact plates.

3. A rheostat comprising opposite sets of contact plates mounted on conducting studs and disposed to form two parallel systems, an insulated bridge contact plate movable between the said opposite contact plates and guided by the said studs; carbon plates assembled on and movable along the said studs and disposed in sets between the bridge contact plate and the said opposite sets of contact plates, and means to press the bridge contact plate in either direction against either set of carbon plates, substantially as described.

In testimony whereof, I affix my signature.

ALBERT J. ALLEN.

Witness:
JOHN J. D. TAYLOR.